(12) United States Patent
Asano et al.

(10) Patent No.: US 11,305,388 B2
(45) Date of Patent: Apr. 19, 2022

(54) MACHINE TOOL

(71) Applicant: MAKINO MILLING MACHINE CO., LTD., Tokyo (JP)

(72) Inventors: Masahiro Asano, Yamanashi (JP); Yuichi Yonemitsu, Yamanashi (JP); Naokazu Sugiyama, Yamanashi (JP); Naoya Sumita, Yamanashi (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 112 days.

(21) Appl. No.: 16/646,869

(22) PCT Filed: Sep. 13, 2017

(86) PCT No.: PCT/JP2017/033110
§ 371 (c)(1),
(2) Date: Mar. 12, 2020

(87) PCT Pub. No.: WO2019/053829
PCT Pub. Date: Mar. 21, 2019

(65) Prior Publication Data
US 2020/0276678 A1 Sep. 3, 2020

(51) Int. Cl.
*B23Q 1/48* (2006.01)
*B23Q 7/00* (2006.01)
(52) U.S. Cl.
CPC ............... *B23Q 1/48* (2013.01); *B23Q 7/00* (2013.01); *Y10T 29/5196* (2015.01)

(58) Field of Classification Search
CPC .......... B23Q 7/02; B23Q 7/14; B23Q 7/1431; B23Q 7/1426; B23Q 7/00
See application file for complete search history.

(56) References Cited

U.S. PATENT DOCUMENTS 4,644,635 A * 2/1987 Murai ..................... B23Q 1/54
269/71
2009/0110505 A1 4/2009 Jung
2014/0338163 A1 11/2014 Tsuchiya et al.
2015/0016914 A1 1/2015 Nishida et al.

FOREIGN PATENT DOCUMENTS

| CN | 2758014 Y | 2/2006 |
|----|-----------|--------|
| CN | 101456138 A | 6/2009 |
| CN | 103796793 A | 5/2014 |
| GB | 2121713 A | 1/1984 |

(Continued)

*Primary Examiner* — Tyrone V Hall, Jr.
(74) *Attorney, Agent, or Firm* — Morrison & Foerster LLP

(57) ABSTRACT

This machine tool is provided with: a bridge which is provided on a base in such a way as to straddle a moving body in a direction (X) perpendicular to a direction of movement (Z) of the moving body at a stroke end (E2) of the moving body; a pallet exchanging arm which is provided above the bridge and which engages with a pallet (P) supported on the moving body and a pallet (P) on a pallet loading station, lifts both pallets (P), and pivots about a vertical axis (Ov) to exchange the two pallets (P); and an arm drive device which is provided projecting upward on the bridge, and which moves the pallet exchanging arm along the vertical axis (Ov) and causes the pallet exchanging arm to pivot about the vertical axis (Ov).

6 Claims, 7 Drawing Sheets

(56) References Cited

FOREIGN PATENT DOCUMENTS

| | | |
|---|---|---|
| JP | S61-86144 A | 5/1986 |
| JP | H6-27309 A | 2/1994 |
| JP | H6-27309 Y2 | 7/1994 |
| JP | H8-294840 A | 11/1996 |
| JP | H11-90759 A | 4/1999 |
| JP | 2001-018138 A | 1/2001 |
| JP | 2008-114304 A | 5/2008 |
| JP | 2001-009665 A | 1/2016 |
| WO | 2014/024319 A1 | 2/2014 |

\* cited by examiner

MACHINE TOOL

CROSS-REFERENCE TO RELATED APPLICATIONS

This application is a U.S. national phase patent application of International Patent Application No. PCT/JP2017/033110 filed Sep. 13, 2017, which is hereby incorporated by reference in the present disclosure in its entirety.

FIELD OF THE DISCLOSURE

The present application relates to a machine tool having a pallet changer.

BACKGROUND OF THE DISCLOSURE

Known in the past have been various systems for changing pallets at machine tools (for example, see, PTLs 1 and 2). PTL 1 discloses a rotating type drive system for pallets. This system is provided with a fixed base provided on a bed. At the two sides of the fixed base, two support stands are positioned. The fixed base has a rotating cylinder from which a pallet can be suspended. The rotating cylinder is configured to rotate to change pallets on the two support stands.

Further, PTL 2 discloses a pallet changer. In the pallet changer, two frame columns are made to stand on a bed. Between the top end parts of the two frame columns, a beam is laid. The beam is provided with a support and drive mechanism. At the support and drive mechanism, an arm shaft extending downward from the beam is coupled. At the bottom end of the arm shaft, a pallet changing arm is provided. The pallet changing arm is configured to rotate to exchange a pallet on a pallet stocker and a pallet on a table.

PATENT LITERATURE

[PTL 1] Japanese Unexamined Patent Publication No. H11-90759

[PTL 2] Japanese Examined Utility Model Publication No. H6-27309

SUMMARY OF THE DISCLOSURE

In the above-mentioned pallet changers, there has been a need for developing a structure able to reduce the occupied area.

One aspect of the present disclosure is a machine tool for processing a workpiece by moving a pallet attached with the workpiece and a spindle attached with a tool relative to each other, the machine tool comprising a moving member exchangably attached with a pallet and moving in a horizontal direction, a pallet changer engaging with the pallet attached to the moving member and a pallet on a pallet loading table, and exchanging the two pallets by rotating the pallets about a vertical axis, and a support stand for supporting the pallet changer, the support stand securing a space where the moving member slides below the pallet changer beyond the vertical axis, when the moving member is at a pallet changing position.

In the machine tool according to one aspect of the present disclosure, when the moving member is at the pallet changing position, the moving member can slide below the pallet changer beyond the vertical axis of the pallet changer due to the support stand. Accordingly, it is possible to arrange the center of rotation of the pallet changing arm and the pallet changing position closer to each other, and thereby the radius of rotation can be reduced. Therefore, it is possible to decrease the area occupied by the pallet changer.

The moving member may have an inclined rotational motion guide rotating the pallet about an inclination axis perpendicular to an inclined surface that is inclined with respect to the direction of movement of the moving member, wherein the pallets are exchanged when the pallets are in a horizontal posture With such a configuration, the weights of the pallets and workpiece are supported by the inclined surface. Therefore, a moment is generated at the moving member. To increase the rigidity with respect to this moment and to house a rotational drive device of the pallets, the moving member sticks out in the direction of movement. Due to the moving member sticking out in the direction of movement, the reduction of the radius of rotation due to the support stand straddling the moving member is more effective.

The support stand may be a bridge provided on a base so as to straddle the moving member in a direction vertical to the direction of movement of the moving member. Further, the bridge may be supported at the two ends or supported at one end.

The support stand may be integrally formed with an oil pan of the pallet loading station by a casting. In this case, it is possible to decrease the number of parts and increase the rigidity of the support stand.

The pallet changer may have a pallet changing arm provided above the support stand and engaging with the pallet attached to the moving member and the pallet on the pallet loading station, and an arm driving device provided on the support stand so as to stick out upward, the arm driving device moving the pallet changing arm upward and downward along the vertical axis and rotating the pallet changing arm about the vertical axis. Since the arm driving device lifting and rotating the pallet changing arm is provided on the support stand so as to stick out upward, it is possible to secure a large space below the support stand.

The pallet changing arm may have a pair of arm elements. Each of the pair of arm elements may have a fork shape. At least one arm part of the fork shape may have an opening/closing mechanism opening when the moving member is at a machining position and closing when the moving member is at a pallet changing position. Since at least one arm part of the fork shape opens when the moving member is at the machining position, it is possible to avoid interference between the pallet and arm element, in particular with the moving member where the pallet rotates about the inclination axis.

The arm driving device may have a lift actuator moving upward and downward with respect to the support stand along the vertical axis, and a cylindrical cam reciprocating with respect to the lift actuator along the vertical axis, The pallet changing arm may be supported so as to rotate with respect to the lift actuator about the vertical axis and may be attached with a cam follower engaging with a spiral-shaped cam groove at the outer circumference of the cylindrical cam. The lift movement of the lift actuator and reciprocating movement of the cylindrical cam are both performed in directions along the vertical axis, and therefore it is possible to use fluid pressure cylinders as actuators of both the movements and arrange them coaxially so as to reduce space.

According to one aspect of the present disclosure, it is possible to provide a pallet changer able to reduce the area occupied thereby.

DETAILED DESCRIPTION OF THE DISCLOSURE

Below, referring to the attached drawings, a machine tool having a pallet changer according to an embodiment will be explained. Similar or corresponding elements are assigned the same notations and overlapping explanations will be omitted. To facilitate understanding, the scales of the figures may be changed.

Figure 1:
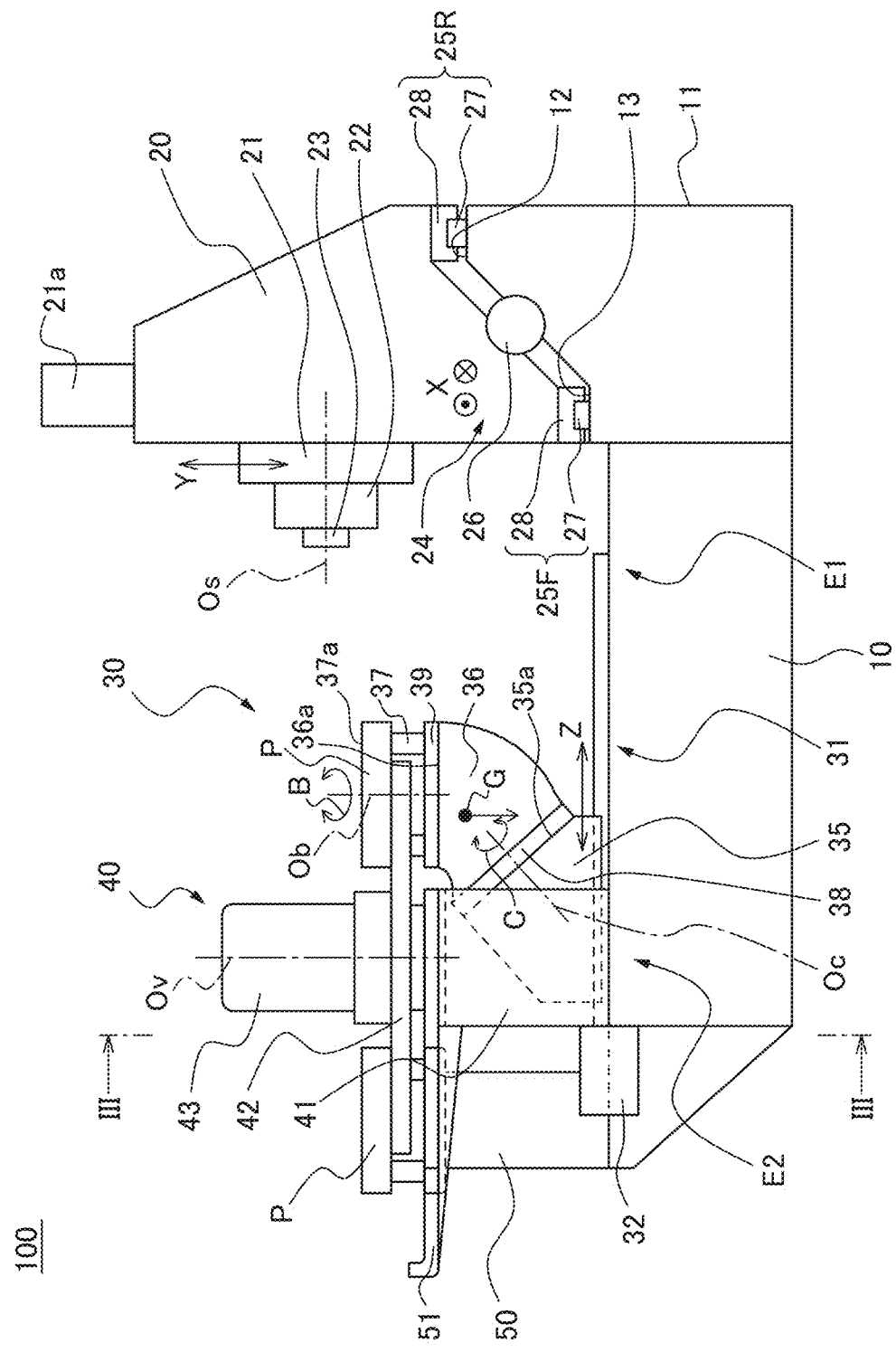
FIG. 1 is a schematic view of a machine tool including a pallet changer according to one embodiment.
Figure 2:
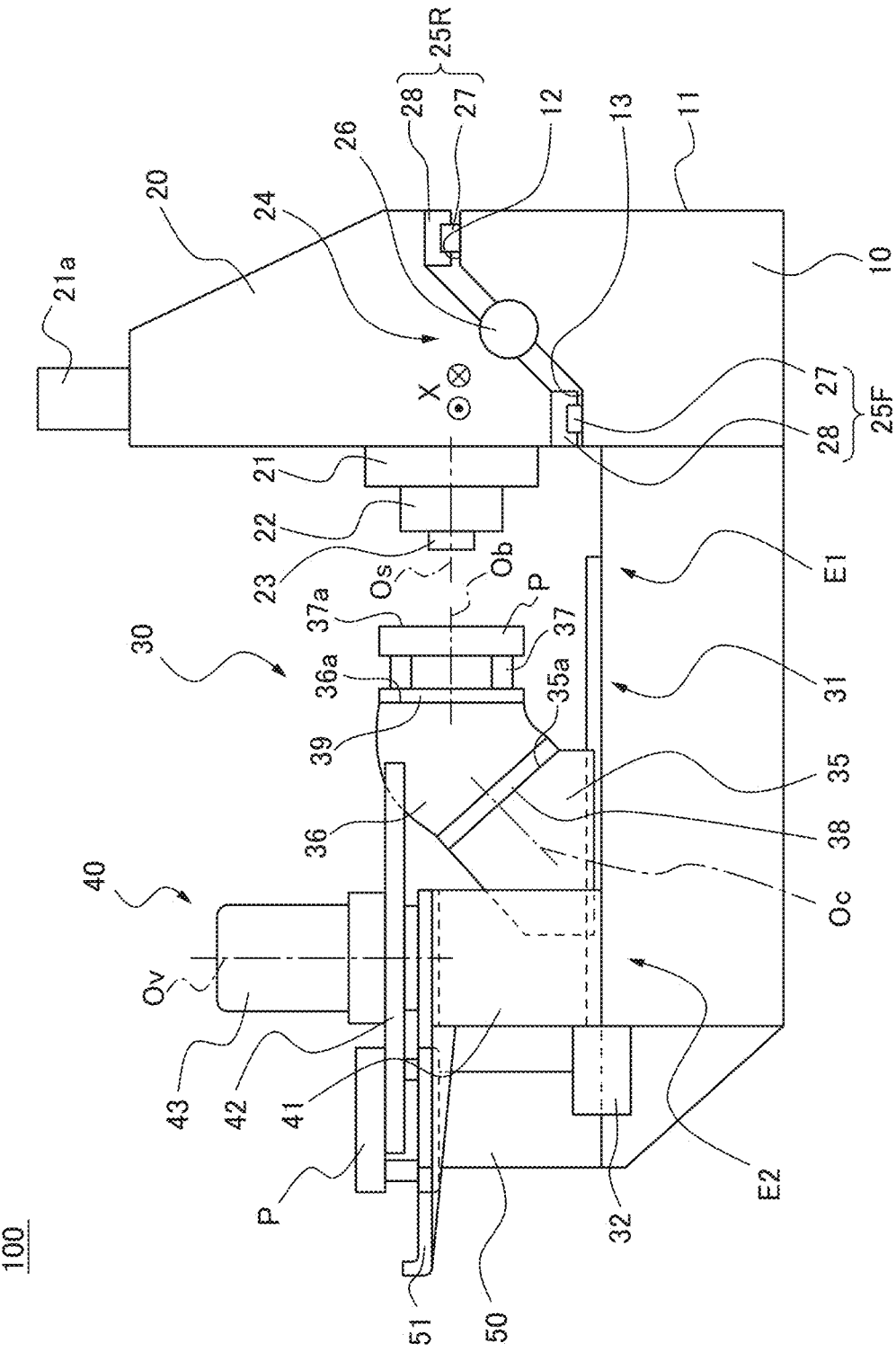
FIG. 2 is a schematic view showing another state of the machine tool of FIG. 1.
Figure 3:
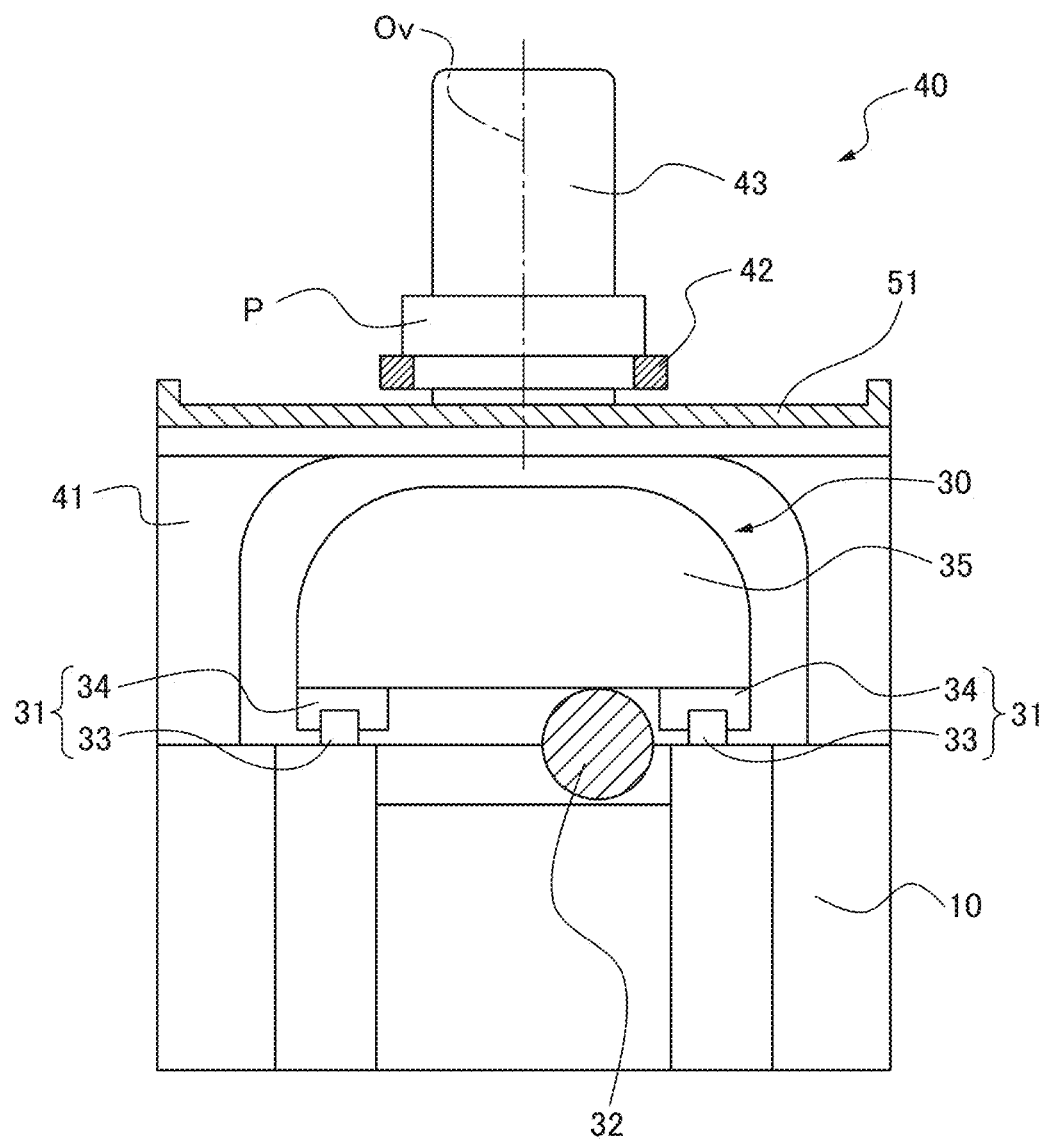
FIG. 3 is a cross-sectional view along the arrow in FIG. 1.

FIG. 1 is a schematic view of a machine tool including a pallet changer according to one embodiment. It shows the state where a table 30 is at a pallet changing position and a workpiece mounting surface 37a of the pallet P is in a horizontal posture. FIG. 2 is a schematic view showing another state of the machine tool of FIG. 1. It shows the state where the table 30 is at a machining position and the workpiece mounting surface 37a is in a vertical posture. FIG. 3 is a cross-sectional view along the arrow in FIG. 1. Referring to FIG. 1, the machine tool 100 is a horizontal machining center. In another embodiment, the machine tool 100 may be other machine tool which can be provided with a pallet changer, for example, such as a vertical machining center or a machining center having a tilting spindle. In the present embodiment, the machine tool 100 is a five-axis machine tool having three translation feed axes (X-axis, Y-axis, and Z-axis) and two rotation feed axes (C-axis and B-axis). The machine tool 100 is provided with a bed (also called a "base") 10, column 20, table (also called a "moving member") 30, pallet changer 40, and pallet loading station 50.

The bed 10, for example, can be fixed to the floor of a factory etc. The column 20 is provided on the bed 10 along the rear side surface 11 of the bed 10. At the front side surface of the column 20, a saddle 21 able to move in the vertical direction is provided. From the front side surface of the saddle 21, the spindle head 22 sticks out in the horizontal direction. The spindle 23 is supported to be able to rotate about a horizontal rotational axis Os.

Regarding the directions in the machine tool 100 according to the present embodiment, the rotational axis Os of the spindle 23 extends along the horizontal direction. The direction parallel to the rotational axis Os is defined as the Z-axial direction (also referred to as the front-rear direction). The direction in which the spindle 23 projects along the Z-axial direction is the "front" while the opposite direction is the "rear". The horizontal direction perpendicular to the Z-axial direction is defined as the X-axial direction (also referred to as the left-right direction). The vertical direction is defined as the Y-axial direction (also referred to as the up-down direction).

The saddle 21 is driven in the Y-axial direction by a feed system having a ball-screw mechanism connected to a motor 21a and is guided by a not shown guide. The ball-screw mechanism has a screw shaft supported rotatably at the column 20 and extending in the Y-axial direction and a nut fastened to a saddle 21. By using the motor 21a to make the screw shaft rotate, the nut moves in the Y-axial direction. Therefore, the saddle 21 moves in the Y-axial direction. The feed in the Y-axial direction is controlled by an NC device.

The column 20 moves on the bed 10 in the X-axial direction. Specifically, the column 20 is guided in the X-axial direction by an inclined linear motion guide 24. The inclined linear motion guide 24 faces forward and upward overall, and is inclined so that the rear part thereof is arranged at a position higher than the front part thereof. Specifically, the inclined linear motion guide 24 has a front guide 25F and a rear guide 25R. Each of the front guide 25F and the rear guide 25R includes a rail 27 fastened on the bed 10 and extending in the X-axial direction and a block 28 fastened to the column 20.

The rear guide 25R is arranged at a position higher than the front guide 25F. From another viewpoint, a guide 25R far from the table 30 is arranged at a position higher than the guide 25F close to the table 30. Specifically, the bed 10 has an upward facing rear rail support surface 12 along the rear side surface 11. Further, the bed 10 has an upward facing front rail support surface 13 at the front of the rear rail support surface 12. The rear rail support surface 12 is formed at a position higher than the front rail support surface 13. In another embodiment, at least one of the rear rail support surface 12 and the front rail support surface 13 may face forward. The rail 27 of the rear guide 25R is arranged on the rear rail support surface 12, while the rail 27 of the front guide 25F is arranged on the front rail support surface 13.

The column 20 is driven in the X-axial direction by a feed system having a ball-screw mechanism connected to a motor 26. The ball-screw mechanism is arranged between the front guide 25F and the rear guide 25R. The ball-screw mechanism has a screw shaft supported rotatably at the bed 10 and extending in the X-axial direction and a nut fastened to the column 20. By using the motor 26 to make the screw shaft rotate, the nut moves in the X-axial direction. Therefore, the column 20 moves in the X-axial direction. The feed in the X-axial direction is controlled by the NC device.

The table 30 is provided on the bed 10 at the front of the column 20. The table 30 supports a pallet P. Referring to FIG. 3, the table 30 moves on the bed 10 along a pair of left and right guides 31 in the Z-axial direction. Each of the guides 31 includes a rail 33 fastened to the bed 10 and extending in the Z-axial direction and a block 34 fastened to the table 30. Between the two guides 31, a ball-screw mechanism connected with the motor 32 is arranged. The ball-screw mechanism has a screw shaft supported rotatably at the bed 10 and extending in the Z-axial direction and a nut fastened to the table 30. By using the motor 32 to make the screw shaft motor rotate, the nut moves in the Z-axial direction. Therefore, the table 30 moves in the Z-axial direction. The feed in the Z-axial direction is controlled by the NC device. Referring to FIG. 1, the table 30 moves between the rear stroke end E1 and the front stroke end (in the present embodiment, the pallet changing position) E2. In FIG. 1, the table 30 is at the pallet changing position. Referring to FIG. 2, the table 30 is at the machining position. The machining position can, for example, be set at a position separated from the front stroke end E2 by a predetermined distance or more.

The table 30 has a first table base 35, a second table base 36, and a pallet attachment base 37. The first table base 35 is provided on the bed 10 and moves on the bed 10 in the Z-axial direction. Referring to FIG. 3, at the first table base 35, a block 34 of the above-mentioned guide 31 is fastened.

Referring to FIG. 1, the first table base 35 has a inclined surface 35a which is inclined with respect to the direction of movement of the table 30. Specifically, the inclined surface 35a is inclined from the horizontal by 45° or about 45° so as to face rearward and upward.

The first table base 35 has an inclined rotational motion guide 38 along the inclined surface 35a. Therefore, the inclined rotational motion guide 38 is arranged facing rearward and upward, and the front part thereof is arranged at a position higher than the rear part thereof. The inclined rotational motion guide 38 rotates the second table base 36 about the inclination axis Oc perpendicular to the inclined surface 35a. The rotational feed direction of the second table base 36 is defined as the C-axial direction. For example, the inclined rotational motion guide 38 has a cross roller bearing and the second table base 36 is rotated by a motor or hydraulic apparatus.

The second table base 36 is provided on the inclined rotational motion guide 38. The second table base 36 has a rotating surface 36a. The rotating surface 36a is inclined from the inclined surface 35a by 45° or about 45°. The rotating surface 36a rotates around the inclination axis Oc as the second table base 36 rotates.

The second table base 36 has a pallet rotational guide 39 along the rotating surface 36a. The pallet rotational guide 39 rotates the pallet attachment base 37 about a variable axis Ob perpendicular to the rotating surface 36a. Note that, referring to FIG. 1 and FIG. 2, it can be understood that the orientation of the variable axis Ob changes according to the position of the second table base 36 at the C-axial direction. Referring to FIG. 1, the direction of rotational feed of the pallet rotational guide 39 is defined as the B-axial direction. The pallet rotational guide 39 has, for example, a roller bearing, and is rotationally driven by, for example, a motor or hydraulic apparatus.

The pallet attachment base 37 houses pallet clamps and is provided on the pallet rotational guide 39. A pallet P attached to the pallet attachment base 37 has a workpiece mounting surface 37a parallel to the rotating surface 36a. The workpiece is attached to the workpiece mounting surface 37a. The workpiece mounting surface 37a is oriented to any posture in accordance with the position in the range of movement in the C-axial direction of the second table base 36. For example, in FIG. 1, the workpiece mounting surface 37a is in a horizontal posture. In FIG. 2, the workpiece mounting surface 37a is in a vertical posture.

In the machine tool 100, the inclined linear motion guide 24 of the column 20 and the inclined rotational motion guide 38 of the table 30 are arranged facing each other in the Z-axial direction. From another viewpoint, the inclined linear motion guide 24 of the column 20 has a part overlapping with the inclined rotational motion guide 38 of the table 30 in the Y-axial direction (vertical direction). Therefore, processing reaction forces having facing components in the front-rear direction are generated at the column 20 side and table 30 side, respectively. Therefore, the rigidities of the column 20 and table 30 in the front-rear direction are balanced and deformation can be prevented from concentrating at either of the column 20 or table 30.

Referring to FIG. 1, at table 30, the center of gravity G of the total of the second table base 36 and the objects carried on the second table base 36 (that is, the pallet attachment base 37, pallet P, and workpiece) is positioned on the inclination axis Oc or near the inclination axis Oc. For example, at table 30, when the weights of the pallet P and workpiece are rated weights, the center of gravity G can be set so as to be positioned on the inclination axis Oc. When the table 30 supports a pallet P and workpiece having other weights, the center of gravity G can be positioned near the inclination axis Oc. By such a configuration, the rotational inertia around the inclination axis Oc is small. Accordingly, it is possible to increase the acceleration/deceleration of rapid-feeding in the C-axial direction and as a result shorten the non-processing time.

Referring to FIG. 1, the pallet changer 40 is provided on the front of the bed 10. The pallet changer 40 changes the pallet P supported on the table 30 and the pallet P on the pallet loading station 50 when the table 30 is at the pallet changing position (in the present embodiment, the front stroke end E2). The pallet changer 40 is provided with a bridge 41, pallet changing arm 42, and arm driving device 43. The bridge 41 functions as a support stand of the pallet changer 40.

The bridge 41 is provided on the bed 10 so as to straddle the table 30 in the direction (X-axial direction) vertical to the direction of movement of the table 30 (Z-axial direction) at the front stroke end E2 of the table 30. Specifically, referring to FIG. 3, the bridge 41 generally has an inverted U-shape and spans from one end to the other end of the bed 10 in the X-axial direction so as to straddle the table 30. Referring to FIG. 1, the bridge 41 straddles a part of the first table base 35 of the table 30 and a part of the second table base 36. The bridge 41 may also be configured so as to straddle only the first table base 35. The bridge 41 is integrally formed with the oil pan 51 of the pallet loading station 50 explained later. The bridge 41 and the oil pan 51, for example, can be integrally formed by casting etc.

The pallet changing arm 42 is provided above the bridge 41 through the arm driving device 43. The pallet changing arm 42 engages with the pallet P supported on the table 30 and the pallet P on the pallet loading station 50 to lift up the two pallets, rotates around the vertical axis Ov, then descends and changes the two pallets.

Figure 5:
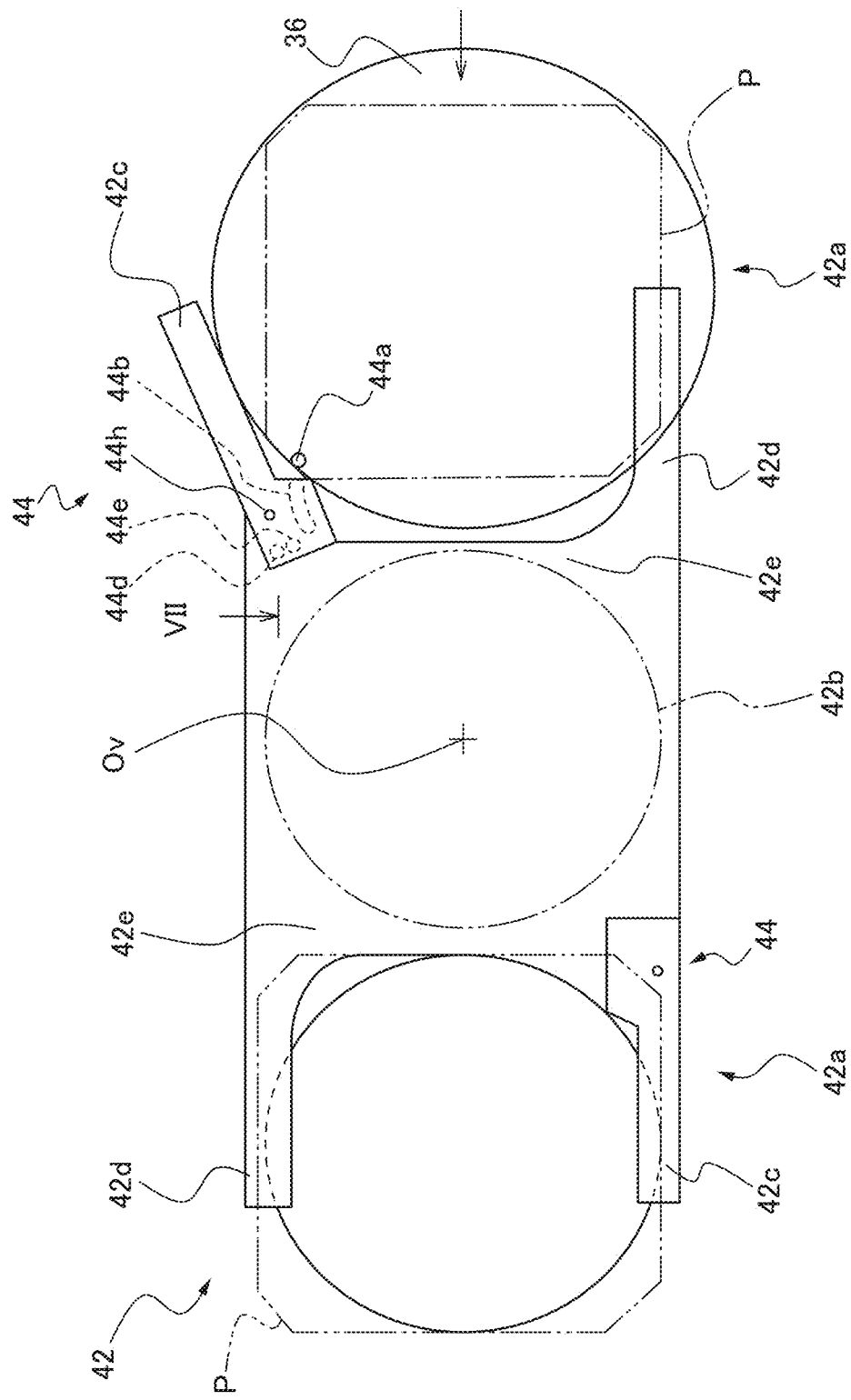
FIG. 5 is a schematic view showing a pallet changing arm at an opened position.
Figure 6:
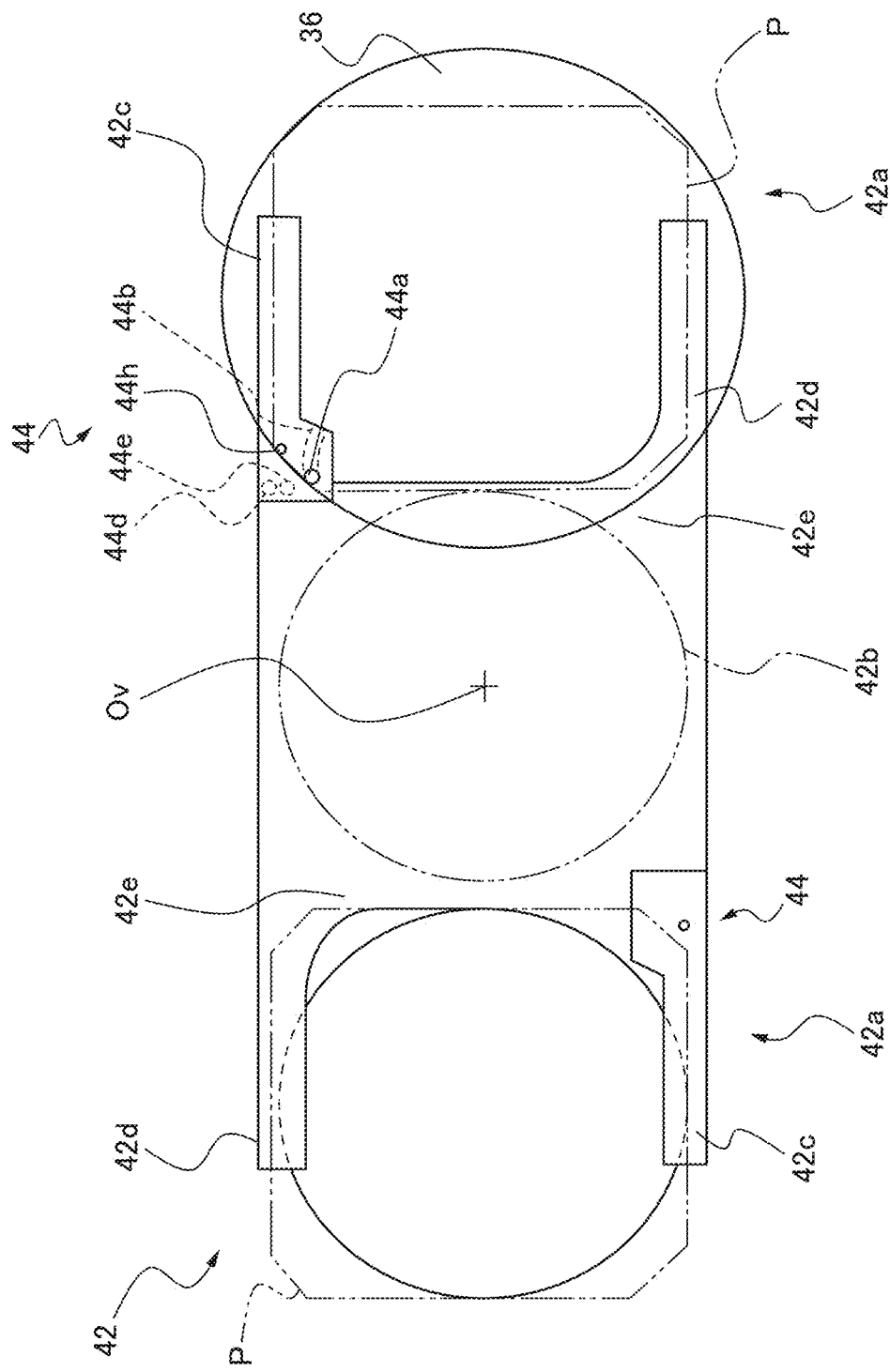
FIG. 6 is a schematic view showing a pallet changing arm at a closed position.

FIG. 5 is a schematic view showing a pallet changing arm at the opened position, while FIG. 6 is a schematic view showing a pallet changing arm at the closed position. Referring to FIG. 5, the pallet changing arm 42 has a pair of arm elements 42a and a center part 42b. The arm elements 42a extend in opposite directions from the vertical axis Ov. Each of the arm elements 42a has a fork shape (or generally U-shaped) and opens at an opposite side to the vertical axis Ov.

The arm element 42a has an opening/closing mechanism 44 opening when the table 30 is at the machining position (FIG. 5) and closing when the table 30 is at the pallet changing position (FIG. 6). Specifically, each of the arm elements 42a includes a movable arm part 42c able to move between an opened position and closed position, a fixed arm part 42d fixed to the closed position, and an arm base 42e connecting the movable arm part 42c and fixed arm part 42d. The opening/closing mechanism 44 is provided at the movable arm part 42c. FIG. 5 shows the movable arm part 42c at the opened position, while FIG. 6 shows the movable arm part 42c at the closed position. As shown in FIG. 5, when the table 30 is at the machining position, the movable arm part 42c is at the opened position. Due to this, when the table 30 rotates in the C-axial direction, it is possible to avoid interference between the arm element 42a and the table 30 (or pallet P or workpiece). The movable arm part 42c is attached movably to the arm base 42e by a pivot pin 44h (explained in detail later). The movable arm part 42c is biased to the opened position by an elastic element, for example, a torsion spring attached to the pivot pin 44h etc. In another embodiment, the other fixed arm part 42d with the fork shape also has an opening/closing mechanism 44 so both arm parts 42c, 42d of the fork shape can be opened and closed. In this case, even if the table 30 rotates to the positive or negative direction at the machining position, there is no interference between the table 30 and arm element 42a.

Figure 7:
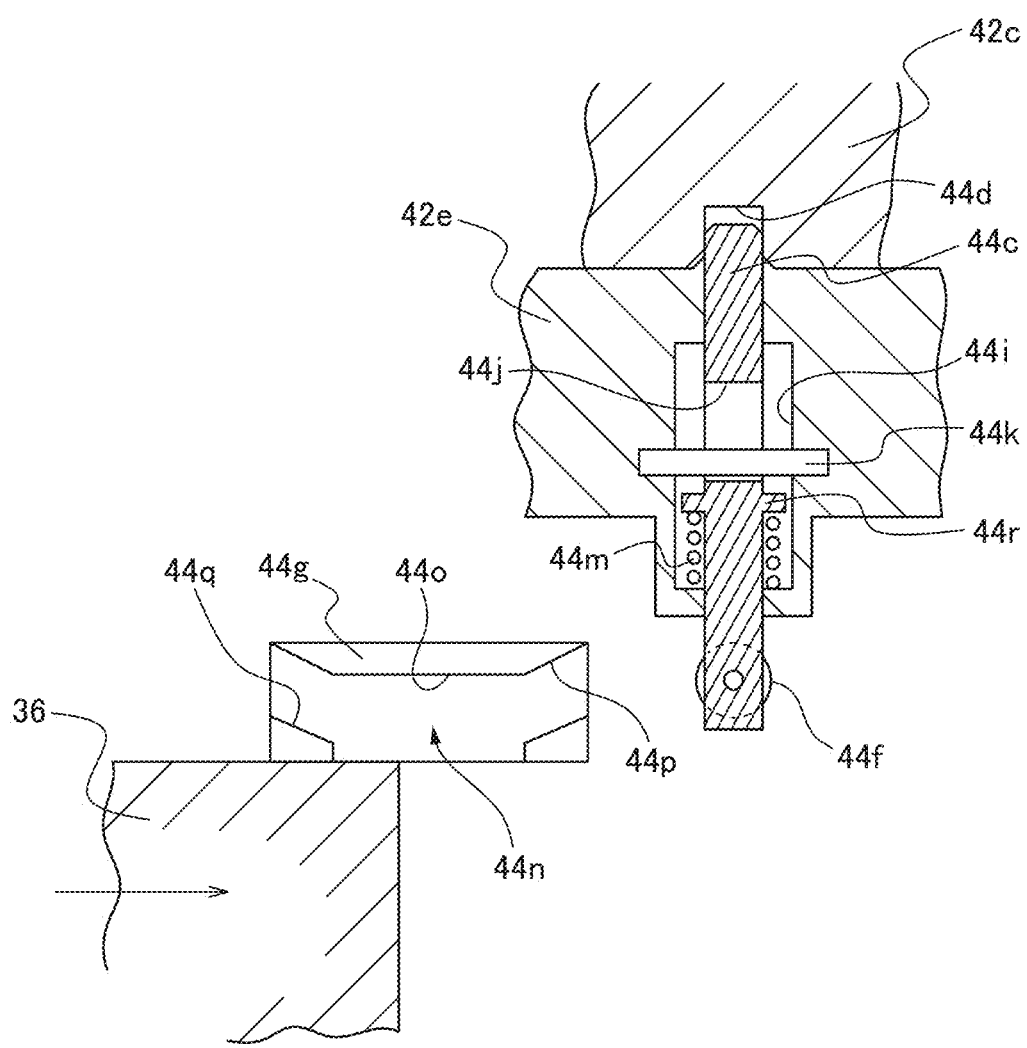
FIG. 7 shows a cross-section VII in FIG. 5.

The opening/closing mechanism 44 includes a drive pin 44a, a cam groove 44b for the drive pin 44a, an engagement hole 44d of the opened position and an engagement hole 44e of the closed position, and a pivot pin 44h. FIG. 7 shows a cross-section VII in FIG. 5. Note that, as shown in FIG. 5, FIG. 7 shows a cross-section VII seen from above in FIG. 5. Therefore, in FIG. 7, opposite to FIG. 5, it should be noted that the second table base 36 is shown at the left side of the movable arm part 42c. Referring to FIG. 7, the opening/closing mechanism 44 further includes a lock pin 44c, cam follower 44f, and cam plate 44g for cam follower 44f.

Referring to FIG. 5, in the present embodiment, the drive pin 44a is provided at the second table base 36. The drive pin 44a sticks out upward from the second table base 36. The cam groove 44b can be provided at the bottom surface of the movable arm part 42c. The cam groove 44b has a curved shape and is configured so that when the table 30 moves from the machining position to the pallet changing position, the drive pin 44a is inserted into the cam groove 44b, the cam groove 44b follows the drive pin 44a and, along with this, the movable arm part 42c is made to move from the opened position (FIG. 5) to the closed position (FIG. 6).

Referring to FIG. 7, the lock pin 44c is provided at the arm base 42e so as to run through the arm base 42e from the top surface to the bottom surface. The lock pin 44c can move between the lock position and unlock position. The lock pin 44c is configured to stick out from the top surface of the arm base 42e at the lock position, and to be retracted to the top surface of the arm base 42e or lower than the top surface of the arm base 42e at the unlock position.

The arm base 42e has a hollow cavity 44i. The lock pin 44c has an elongated hole 44j running through the lock pin 44c in the diametrical direction and extending in the axial direction. At the elongated hole 44j, an anti-rotation pin 44k fastened to the inside of the hollow cavity 44i and extending in the horizontal direction is inserted.

The lock pin 44c has a flange 44r below the elongated hole 44j. Between the bottom surface of the flange 44r and the bottom surface of the hollow cavity 44i, a compression spring 44m is arranged. The compression spring 44m is configured to bias the lock pin 44c to the lock position.

The engagement holes 44d and 44e (in FIG. 7, engagement hole 44e not shown) are provided at the bottom surface of the movable arm part 42c. Referring to FIG. 5, the engagement hole 44d is positioned and set in dimensions so that at the opened position of the movable arm part 42c, the lock pin 44c is inserted into the engagement hole 44d. Referring to FIG. 6, the engagement hole 44e is positioned and set in dimensions so that at the closed position of the movable arm part 42c, the lock pin 44c is inserted into the engagement hole 44e.

Referring to FIG. 7, the cam follower 44f is attached to the bottom end of the lock pin 44c. The cam plate 44g is attached to the second table base 36. The cam plate 44g has a cam groove 44n. The cam grooves 44n includes an intermediate part 44o parallel to the direction of movement of the table 30, and an entrance part 44p and exit part 44q tilted upward from the intermediate part 44o from the direction of movement of the table 30. The cam groove 44n is configured so that when the table 30 moves from the machining position to the pallet changing position, the cam follower 44f is inserted into the cam groove 44n and follows the cam groove 44n along which, first, the lock pin 44c is made to move from the lock position to the unlock position (entrance part 44p), then the lock pin 44c is maintained at the unlock position (intermediate part 44o), and finally the lock pin 44c is returned from the unlock position to the lock position (exit part 44q). Referring to FIG. 5, as explained above, the pivot pin 44h movably attaches the movable arm part 42c with respect to the arm base 42e. The movable arm part 42c rotates around the pivot pin 44h between the opened position and closed position.

The opening/closing mechanism 44 operates in the following order. As shown in FIG. 5, while the table 30 is at the machining position, the movable arm part 42c is at the opened position and the lock pin 44c is inserted into the engagement hole 44d for the opened position. As the table 30 moves from the machining position to the pallet changing position, as shown in FIG. 7, first, the cam follower 44f is inserted into the entrance part 44p of the cam groove 44n and the lock pin 44c is moved from the lock position to the unlock position. Due to this, the lock pin 44c is disengaged from the engagement hole 44d. Next, while the lock pin 44c is maintained in the unlock position at the intermediate part 44o, as shown in FIG. 6, the drive pin 44a is inserted into the cam groove 44b and the movable arm part 42c is made to move from the opened position to the closed position. As shown in FIG. 7, finally, the cam follower 44f emerges from the exit portion 44q of the cam groove 44n and makes the lock pin 44c move from the unlock position to the lock position. Due to this, the lock pin 44c is inserted into the engagement hole 44e for the closed position. Therefore, the movable arm part 42c is configured so as to be locked at the closed position at the pallet changing position. When the table 30 moves from the pallet changing position to the machining position, the opening/closing mechanism 44 operates in the reverse order from the above and makes the movable arm part 42c move from the closed position to the opened position.

Figure 4:
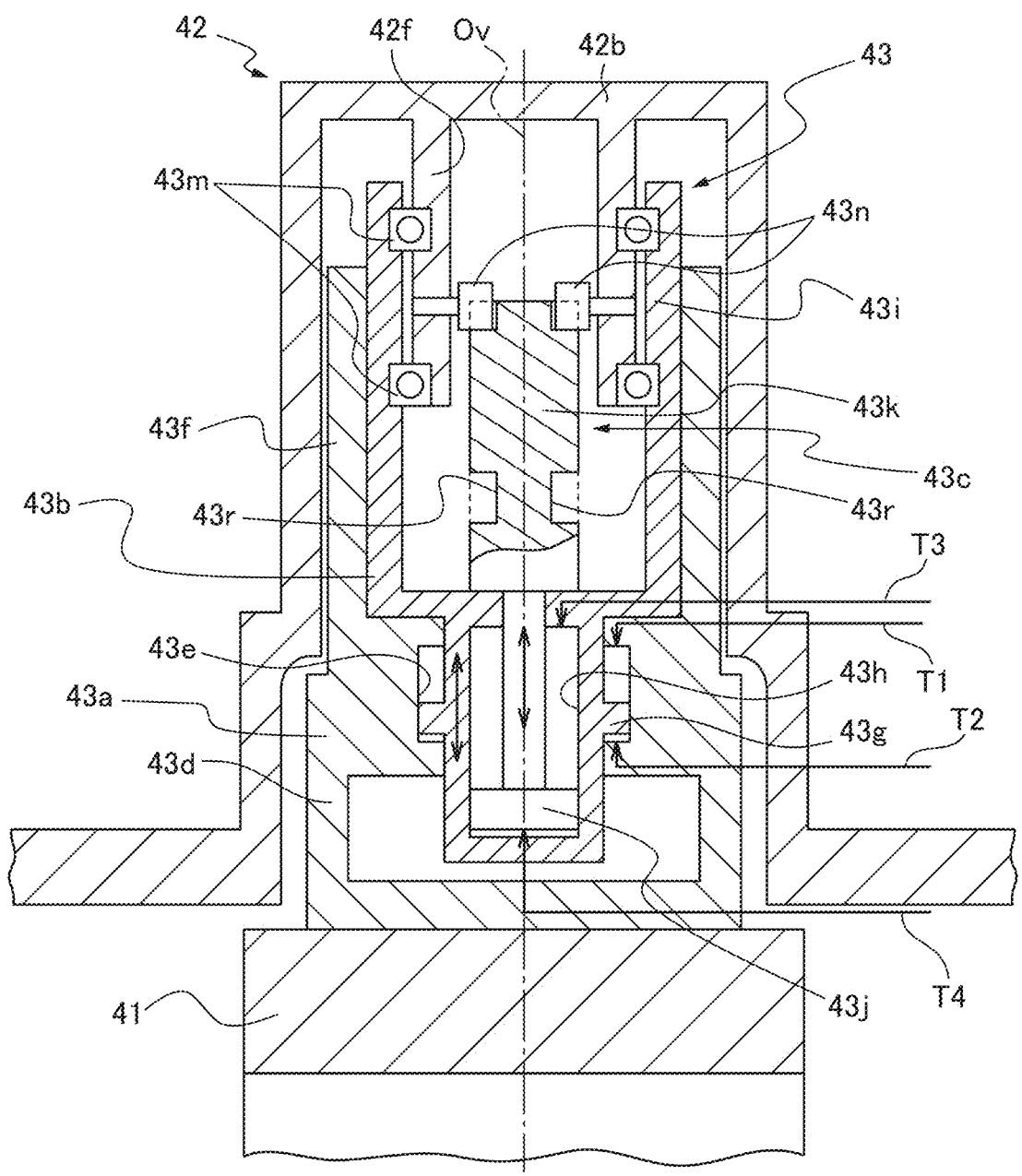
FIG. 4 is an enlarged cross-sectional view showing details of an arm driving device.

FIG. 4 is an enlarged cross-sectional view showing details of the arm driving device. Referring to FIG. 4, the center part 42b of the pallet changing arm 42 has a cylindrical shape covering the arm driving device 43. The top end part of the cylinder is closed. From the top end part of the center part 42b, a cylindrically shaped support part 42f sticks out downward. The arm driving device 43 is provided on the bridge 41 and sticks out upward from the top surface of the bridge 41. The arm driving device 43 is configured to move the pallet changing arm 42 along the vertical axis Ov, and rotate the pallet changing arm 42 about the vertical axis Ov. The arm driving device 43 has a housing 43a, lift actuator 43b, and rotation actuator 43c.

The housing 43a is fastened to the top surface of the bridge 41, and sticks out upward from the top surface of the bridge 41. The housing 43a has a generally cylindrical shape, and includes a fastening part 43d, a lift chamber 43e, and a lift guide part 43f.

The fastening part 43d is fastened to the top surface of the bridge 41. The fastening part 43d has a hollow cavity and houses the bottom end part of the lift actuator 43b. The lift chamber 43e is positioned above the fastening part 43d, and houses a lift piston 43g of the lift actuator 43b (explained later). The lift guide part 43f is positioned above the lift chamber 43e, and houses a bearing case 43i of the lift actuator 43b (explained later).

The lift actuator 43b is inserted inside the housing 43a so as to move along the vertical axis Ov. The lift actuator 43b has a generally cylindrical shape, and includes the lift piston 43g, a rotation chamber 43h, and bearing case 43i.

As explained above, the lift piston 43g is arranged in the lift chamber 43e, and partitions the lift chamber 43e into a top section and a bottom section. At the top section, a descending port T1 is connected. At the bottom section, an ascending port T2 is connected. The descending port T1 and ascending port T2 are connected to components such as a pump, valve, and hydraulic source (or working fluid supply source). These components are controlled by a mechanical control device. The descending port T1 and ascending port T2 supply/discharge working fluid in the lift chamber 43e. For example, when discharging working fluid through the descending port T1 from the top section and supplying working fluid through the ascending port T2 to the bottom section, the lift piston 43g rises and therefore the lift actuator 43b as a whole rises. In contrast, when supplying working fluid through the descending port T1 to the top section and discharging the working fluid through the ascending port T2 from the bottom section, the lift piston 43g descends and therefore the lift actuator 43b as a whole descends.

The rotation chamber 43h is provided at the inside of the lift piston 43g. The rotation chamber 43h houses a rotation piston 43j of the rotation actuator 43c (explained later). The bearing case 43i is positioned above the lift piston 43g. The bearing case 43i fastens an outer race of a bearing 43m. An inner face of the bearing 43m is fastened to the support part 42f of the above-mentioned pallet changing arm 42. Therefore, the pallet changing arm 42 is rotatably supported by the lift actuator 43b through the bearing 43m. Accordingly, when the lift actuator 43b rises, the pallet changing arm 42 also rises, while when the lift actuator 43b descends, the pallet changing arm 42 also descends.

The rotation actuator 43c is inserted coaxially into the lift actuator 43b so as to move along the vertical axis Ov. The rotation actuator 43c has a generally columnar shape and includes a rotation piston 43j and a cylindrical cam part 43k.

As explained above, the rotation piston 43j is arranged inside a rotation chamber 43h, and partitions the rotation chamber 43h into a top section and a bottom section. At the top section, a CW (clockwise) port T3 is connected. At the bottom section, a CCW (counterclockwise) port T4 is connected. The CW port T3 and CCW port T4 are connected to other components such as a pump, valve, and hydraulic source (or working fluid supply source). These components are controlled by the mechanical control device. The CW port T3 and CCW port T4 supply/discharge working fluid in the rotation chamber 43h. When discharging working fluid through the CW port T3 from the top section and supplying working fluid through the CCW port T4 to the bottom section, the rotation piston 43j rises and therefore the rotation actuator 43c as a whole rises. In contrast, when supplying working fluid through the CW port T3 to the top section and discharging working fluid through the CCW port T4 from the bottom section, the rotation use piston 43j descends, therefore the rotation actuator 43c as a whole descends.

The cylindrical cam part 43k is positioned above the rotation use piston 43j. The cylindrical cam part 43k has a cylindrical shape, and moves along the vertical axis Ov as the rotation use piston 43j moves. At the outer circumferential surface of the cylindrical cam part 43k, a pair of cam grooves 43r are provided. Each of the cam grooves 43r is formed in a spiral shape at the outer circumferential surface of the cylindrical cam part 43k.

At the support part 42f of the pallet changing arm 42, a pair of cam followers 43n are provided. Each of the cam followers 43n sticks out inwardly from the support part 42f, and engages with a corresponding cam groove 43r. The cam grooves 43r are configured to rotate the cam followers 43n counterclockwise in a plan view, when the cylindrical cam part 43k rises. Therefore, the pallet changing arm 42 to which the cam follower 43n is coupled also rotates counterclockwise. In contrast, the cam grooves 43r are configured to rotate the cam followers 43n clockwise in the plan view, when cylindrical cam part 43k descends. Therefore, the pallet changing arm 42 to which the cam follower 43n is coupled also rotates clockwise.

The above described arm driving device 43 operates as follows for exchanging the pallet P supported on the table 30 and the pallet P on the pallet loading station 50. First, the lift use piston 43g is at the bottom end position, while the rotation use piston 43j is at the bottom end position or top end position. To engage with and lift up the two pallets P, working fluid is discharged through the descending port T1 from the top section and working fluid is supplied through the ascending port T2 to the bottom section. Due to this, the lift piston 43g rises and the lift actuator 43b as a whole rises. The lift actuator 43b lifts up the center part 42b of the pallet changing arm 42 through the bearing 43m. Due to this, the pallet changing arm 42 as a whole rises and the arm element 42a engages with and lifts up the pallet P.

Next, to change two pallets P, if the rotation piston 43j is at the bottom end position, working fluid is discharged through the CW port T3 from the top section and working fluid is supplied through the CCW port T4 to the bottom section. Due to this, the rotation piston 43j rises and the rotation actuator 43c as a whole rises. The cam grooves 43r of the rotation actuator 43c rotates the pallet changing arm 42 about the vertical axis Ov counterclockwise by 180° via the cam follower 43n. Due to this, the positions of the two pallets P are switched and the pallets P are changed.

In contrast, if the rotation use piston 43j is at the top end position when changing two pallets P, working fluid is supplied through the CW port T3 to the top section and working fluid is discharged through the CCW port T4 from the bottom section. Due to this, the rotation piston 43j descends and the rotation actuator 43c as a whole descends. The cam groove 43r of the rotation actuator 43c rotates the pallet changing arm 42 through the cam follower 43n about the vertical axis Ov clockwise by 180°, whereby the positions of the two pallets P are switched and the pallets P are exchanged.

Referring to FIG. 1, the pallet loading station 50 supports the pallet P. At the pallet loading station 50, for example, a worker or robot can exchange a processed workpiece with an unprocessed workpiece. At the pallet loading station 50, an oil pan 51 is arranged for preventing machining oil from dropping down. As explained above, the oil pan 51 is integrally formed with the bridge 41 of the pallet changer 40 by a casting.

In the pallet changer 40 of the above described machine tool 100 according to the present embodiment, as shown in FIG. 1, the pallet changing arm 42 and arm driving device 43 are on the bridge 41. The bridge 41 straddles the table 30 at the front stroke end E2. At the same time, the front end part of the table 30 slides below the pallet changer 40 to the front beyond the vertical axis Ov. Therefore, the table 30 can be positioned in the space below the bridge 41 at the front stroke end E2, and the bridge 41 and the table 30 overlap in the movement direction (Z-direction). Accordingly, it is possible to arrange the vertical axis Ov of the pallet changing arm 42 and the pallet changing position closer to each other by the overlapping distance between the bridge 41 and the table 30. Due to this, it is possible to reduce the radius of rotation of the pallet changing arm 42. Therefore, it is possible to decrease the area occupied by the pallet changer 40.

Further, in the present embodiment, the table 30 has a inclined rotational motion guide 38 rotating the pallet P about the inclination axis Oc perpendicular to the inclined surface 35a that is inclined with respect to the direction of movement of the table 30. In such a configuration, the weights of the pallet P and workpiece are supported by the inclined surface 35a, and therefore a moment is generated at the table 30. To increase the rigidity with respect to the moment and to house the rotational drive device of the pallet P, the table 30 sticks out to the front side as shown in FIG. 1. In such a table 30, reduction of the radius of rotation by the bridge 41 straddling the table 30 is more effective.

Further, in the present embodiment, the pallet changing arm 42 has a pair of arm elements 42a, each of the pair of arm elements 42a has fork shaped arm parts 42c, 42d, and at least one arm part 42c of the arm parts 42c, 42d has an opening/closing mechanism 44 opening when the table 30 is at the machining position and closing when the table 30 is at the pallet changing position. By the arm part 42c opening when the table 30 is at the machining position, interference between the arm element 42a and the table 30 (or pallet P or workpiece) can be avoided.

Further, in the present embodiment, the bridge 41 is integrally formed with the oil pan 51 of the pallet loading station 50 by casting. Therefore, it is possible to reduce the number of parts and possible to increase the rigidity of the bridge 41. The chips and machining fluid received at the oil pan 51 drop down into the chip trough of the bed 10.

Further, in the present embodiment, the rotation actuator 43c of the arm driving device 43 has a cylindrical cam part 43k moved along the vertical axis Ov. A cam groove 43r is provided at the outer circumferential surface of the cylindrical cam part 43k. In such a configuration, a cam follower 43n can be coupled with the pallet changing arm 42. The cam groove 43r and cam follower 43n can be used to mechanically rotate the rotation actuator 43c. Therefore, for example, a hydraulic mechanism etc. can be used to drive the pallet changing arm 42 by a high torque. Further, by providing the lift actuator 43b and the rotation actuator 43c coaxially, the space occupied by the arm driving device 43 can be reduced.

The embodiment of a machine tool having a pallet changer was explained, but the present invention is not limited to the above embodiment. A person skilled in the art could understand that various modifications may be made to the above embodiment. Further, a person skilled in the art could understand that the features included in one embodiment could be incorporated into other embodiments or could replace features included in other embodiments, unless causing a contradiction. For example, in the above embodiment, the table 30 has a double-axis rotational feed mechanism of an inclined rotational motion guide 38 and pallet rotation guide 39. However, in another embodiment, the table 30 need not have the inclined rotational motion guide 38. For example, it may have only a single-axis rotational feed mechanism of a horizontal pallet rotation guide.

REFERENCE SIGNS LIST 10 bed
20 column
22 spindle head
23 spindle
30 table
35 first table base
35a inclined surface
36 second table base
36a rotating surface
40 pallet changer
41 bridge
42 pallet changing arm
43 arm driving device
44 opening/closing mechanism
50 pallet loading station
51 oil pan
100 machine tool
P pallet

The invention claimed is:

1. A machine tool for processing a workpiece by moving a pallet attached with the workpiece and a spindle attached with a tool relative to each other, the machine tool comprising
    a moving member exchangably attached with a pallet and moving in a horizontal direction,
    a pallet changer engaging with the pallet attached to the moving member and a pallet on a pallet loading station, and exchanging the two pallets by rotating the pallets about a vertical axis, and
    a support stand for supporting the pallet changer, the support stand securing a space where the moving member slides below the pallet changer beyond the vertical axis, when the moving member is at a pallet changing position, wherein
    the support stand is a bridge provided on a base so as to straddle the moving member in a direction vertical to the direction of movement of the moving member.

2. The machine tool of claim 1, wherein the moving member has an inclined rotational motion guide rotating the pallet about an inclination axis perpendicular to an inclined surface that is inclined with respect to the direction of movement of the moving member, wherein the pallets are exchanged when the pallets are in a horizontal posture.

3. The machine tool of claim 1, wherein the support stand is integrally formed with an oil pan of the pallet loading station by casting.

4. The machine tool of claim 1, wherein the pallet changer has a pallet changing arm provided above the support stand and engaging with the pallet attached to the moving member and the pallet on the pallet loading station, and an arm driving device provided on the support stand so as to stick out upward, the arm driving device moving the pallet changing arm upward and downward along the vertical axis and rotating the pallet changing arm about the vertical axis.

5. The machine tool of claim 4, wherein the pallet changing arm has an opening/closing mechanism having a pair of arm elements, each of the pair of arm elements having a fork shape, at least one arm part of the fork shape opening when the moving member is at a machining position and closing when the moving member is at the pallet changing position.

6. The machine tool of claim 4, wherein the arm driving device has a lift actuator moving upward and downward with respect to the support stand along the vertical axis, and a cylindrical cam reciprocating with respect to the lift actuator along the vertical axis, and the pallet changing arm is supported so as to rotate with respect to the lift actuator about the vertical axis and is attached with a cam follower that engages with a spiral shaped cam groove at an outer circumference of the cylindrical cam.

* * * * *